United States Patent
Sajassi et al.

(10) Patent No.: US 8,169,924 B2
(45) Date of Patent: May 1, 2012

(54) OPTIMAL BRIDGING OVER MPLS/IP THROUGH ALIGNMENT OF MULTICAST AND UNICAST PATHS

(75) Inventors: Ali Sajassi, San Ramon, CA (US); Dino Farinacci, San Jose, CA (US); John M. Zwiebel, Santa Cruz, CA (US); Daniel Alvarez, Pleasanton, CA (US)

(73) Assignee: Cisco Technology, Inc., San Jose, CA (US)

( * ) Notice: Subject to any disclaimer, the term of this patent is extended or adjusted under 35 U.S.C. 154(b) by 1217 days.

(21) Appl. No.: 11/296,550

(22) Filed: Dec. 7, 2005

(65) Prior Publication Data

US 2007/0025277 A1    Feb. 1, 2007

Related U.S. Application Data

(60) Provisional application No. 60/704,817, filed on Aug. 1, 2005.

(51) Int. Cl.
*G01R 31/08* (2006.01)

(52) U.S. Cl. ........ 370/249; 370/248; 370/256; 370/312; 370/400; 370/408; 714/716; 714/717

(58) Field of Classification Search .......... 370/432, 370/400, 408, 352, 390, 312, 396, 236.1, 370/236.2, 241–251, 254–256; 714/716, 714/717
See application file for complete search history.

(56) References Cited

U.S. PATENT DOCUMENTS

| | | | |
|---|---|---|---|
| 5,331,637 A * | 7/1994 | Francis et al. ............. | 370/408 |
| 5,818,842 A | 10/1998 | Burwell et al. | |
| 5,848,227 A | 12/1998 | Sheu | |
| 6,073,176 A | 6/2000 | Baindur et al. | |
| 6,188,694 B1 | 2/2001 | Fine et al. | |
| 6,301,244 B1 | 10/2001 | Huang et al. | |
| 6,304,575 B1 | 10/2001 | Carroll et al. | |
| 6,308,282 B1 | 10/2001 | Huang | |
| 6,373,838 B1 | 4/2002 | Law et al. | |
| 6,424,657 B1 | 7/2002 | Voit et al. | |
| 6,430,621 B1 | 8/2002 | Srikanth et al. | |
| 6,484,209 B1 | 11/2002 | Momirov | |
| 6,502,140 B1 * | 12/2002 | Boivie ..................... | 709/238 |

(Continued)

FOREIGN PATENT DOCUMENTS

WO    WO 2007/031002 A    3/2007

(Continued)

OTHER PUBLICATIONS

Lahti "Quality of Service in the Poin-to-Point Protocol over Ethernet" in: Google Scholar (on line.

(Continued)

*Primary Examiner* — Christopher Grey
(74) *Attorney, Agent, or Firm* — Baker Botts L.L.P.

(57) ABSTRACT

A provider edge (PE) node of a network operates to send a trace path message over the network to a receiver PE node, the trace path message recording a list of intermediate nodes of a unicast path from the PE node to the receiver PE node; and receive a join message initiated from the receiver PE node, the join message using the list to propagate to the source PE node through the intermediate nodes such that a branch of a multicast tree is aligned with the unicast path. It is submitted with the understanding that it will not be used to interpret or limit the scope or meaning of the claims. 37 CFR 1.72(b).

16 Claims, 4 Drawing Sheets

U.S. PATENT DOCUMENTS

| | | |
|---|---|---|
| 6,519,231 B1 | 2/2003 | Ding et al. |
| 6,611,869 B1 | 8/2003 | Eschelbeck et al. |
| 6,665,273 B1 | 12/2003 | Goguen et al. |
| 6,667,982 B2 | 12/2003 | Christie et al. |
| 6,668,282 B1 | 12/2003 | Booth, III et al. |
| 6,693,878 B1 | 2/2004 | Daruwalla et al. |
| 6,732,189 B1 | 5/2004 | Novaes |
| 6,763,469 B1 | 7/2004 | Daniely |
| 6,785,232 B1 | 8/2004 | Kotser et al. |
| 6,785,265 B2 | 8/2004 | White et al. |
| 6,789,121 B2 | 9/2004 | Lamberton et al. |
| 6,798,775 B1 | 9/2004 | Bordonaro |
| 6,801,533 B1 | 10/2004 | Barkley |
| 6,813,268 B1 | 11/2004 | Kalkunte et al. |
| 6,826,698 B1 | 11/2004 | Minkin et al. |
| 6,829,252 B1 | 12/2004 | Lewin et al. |
| 6,839,348 B2 | 1/2005 | Tang et al. |
| 6,850,521 B1 | 2/2005 | Kadambi et al. |
| 6,850,542 B2 | 2/2005 | Tzeng |
| 6,852,542 B2 | 2/2005 | Mandel et al. |
| 6,882,643 B1 * | 4/2005 | Mauger et al. ............... 370/389 |
| 6,892,309 B2 | 5/2005 | Richmond et al. |
| 6,954,436 B1 | 10/2005 | Yip |
| 7,009,983 B2 | 3/2006 | Mancour |
| 7,016,351 B1 * | 3/2006 | Farinacci et al. ............. 370/392 |
| 7,092,389 B2 | 8/2006 | Chase et al. |
| 7,113,512 B1 | 9/2006 | Holmgren et al. |
| 7,116,665 B2 | 10/2006 | Balay et al. |
| 7,173,934 B2 | 2/2007 | Lapuh et al. |
| 7,277,936 B2 * | 10/2007 | Frietsch .................. 709/223 |
| 7,281,058 B1 * | 10/2007 | Shepherd et al. ............. 709/238 |
| 7,310,342 B2 | 12/2007 | Rouleau |
| 7,333,487 B2 * | 2/2008 | Novaes .................. 370/390 |
| 7,345,991 B1 | 3/2008 | Shabtay et al. |
| 7,408,936 B2 | 8/2008 | Ge et al. |
| 7,466,703 B1 * | 12/2008 | Arunachalam et al. ........ 370/392 |
| 7,701,936 B2 * | 4/2010 | Hongal et al. ................ 370/390 |
| 7,855,950 B2 * | 12/2010 | Zwiebel et al. ............... 370/216 |
| 7,978,718 B2 * | 7/2011 | Farinacci et al. ............. 370/408 |
| 7,990,963 B1 * | 8/2011 | Aggarwal et al. ............. 370/390 |
| 2002/0032780 A1 | 3/2002 | Moore et al. |
| 2002/0087721 A1 | 7/2002 | Sato et al. |
| 2002/0156612 A1 | 10/2002 | Schulter et al. |
| 2002/0196795 A1 | 12/2002 | Higashiyama |
| 2003/0012183 A1 | 1/2003 | Butler |
| 2003/0036375 A1 | 2/2003 | Chen et al. |
| 2003/0101243 A1 | 5/2003 | Donahue et al. |
| 2003/0110268 A1 | 6/2003 | Kermarec et al. |
| 2003/0112781 A1 | 6/2003 | Kermode et al. |
| 2003/0142674 A1 | 7/2003 | Casey |
| 2003/0154259 A1 | 8/2003 | Lamberton et al. |
| 2003/0177221 A1 | 9/2003 | Ould-Brahim et al. |
| 2004/0095940 A1 | 5/2004 | Yuan et al. |
| 2004/0102182 A1 | 5/2004 | Reith et al. |
| 2004/0125809 A1 | 7/2004 | Jeng |
| 2004/0141501 A1 | 7/2004 | Adams et al. |
| 2004/0151180 A1 | 8/2004 | Hu et al. |
| 2004/0158735 A1 | 8/2004 | Roese |
| 2004/0165525 A1 | 8/2004 | Burak |
| 2004/0165600 A1 | 8/2004 | Lee |
| 2004/0172559 A1 | 9/2004 | Luo et al. |
| 2004/0228291 A1 | 11/2004 | Huslak et al. |
| 2004/0233891 A1 | 11/2004 | Regan |
| 2004/0264364 A1 | 12/2004 | Sato |
| 2005/0007951 A1 | 1/2005 | Lapuh et al. |
| 2005/0025143 A1 | 2/2005 | Chen et al. |
| 2005/0030975 A1 | 2/2005 | Wright et al. |
| 2005/0044265 A1 | 2/2005 | Vinel et al. |
| 2005/0063397 A1 | 3/2005 | Wu et al. |
| 2005/0068972 A1 | 3/2005 | Burns et al. |
| 2005/0089047 A1 | 4/2005 | Ould-Brahim et al. |
| 2005/0099949 A1 | 5/2005 | Mohan et al. |
| 2005/0152370 A1 | 7/2005 | Meehan et al. |
| 2005/0157664 A1 | 7/2005 | Baum |
| 2005/0157751 A1 | 7/2005 | Rabie et al. |
| 2005/0163049 A1 | 7/2005 | Yazaki et al. |
| 2005/0175022 A1 | 8/2005 | Nishimura et al. |
| 2005/0190773 A1 | 9/2005 | Yang et al. |
| 2005/0239445 A1 | 10/2005 | Karaogguz et al. |
| 2005/0249124 A1 | 11/2005 | Elie-Dit-Cosaque et al. |
| 2005/0286503 A1 | 12/2005 | Oda et al. |
| 2006/0007867 A1 | 1/2006 | Elie-Dit-Cosaque et al. |
| 2006/0092847 A1 | 5/2006 | Mohan et al. |
| 2006/0098607 A1 | 5/2006 | Zeng |
| 2006/0182037 A1 | 8/2006 | Chen et al. |
| 2006/0248277 A1 | 11/2006 | Pande |
| 2006/0285500 A1 | 12/2006 | Booth |
| 2006/0285501 A1 | 12/2006 | Damm |

FOREIGN PATENT DOCUMENTS

WO    WO 2008/089370    7/2008

OTHER PUBLICATIONS

<URL:http://www.e.kth.se/~e95_pla/exjobb/doc/Lahti_Thesis_QoS_in_PPPoE.pdf>) Oct. 1, 2000.

* cited by examiner

OPTIMAL BRIDGING OVER MPLS/IP THROUGH ALIGNMENT OF MULTICAST AND UNICAST PATHS

RELATED APPLICATIONS

This application claims the benefit of U.S. Provisional Patent Application No. 60/704,817 filed Aug. 1, 2005, entitled "Multicast Mechanism For VPLS". The present application is also related to co-pending application entitled, "Congruent Forwarding Paths For Unicast and Multicast Traffic" filed concurrently herewith, which application is assigned to the assignee of the present application.

FIELD OF THE INVENTION

The present invention relates generally to digital computer network technology; more particularly, to methods and apparatus for providing Local Area Network (LAN) emulation services over Internet protocol (IP) networks.

BACKGROUND OF THE INVENTION

A LAN is a high-speed network (typically 10 to 1000 Mbps) that supports many computers connected over a limited distance (e.g., under a few hundred meters). Typically, a LAN spans a single building. U.S. Pat. No. 6,757,286 provides a general description of a LAN segment. A Virtual Local Area Network (VLAN) is mechanism by which a group of devices on one or more LANs that are configured using management software so that they can communicate as if they were attached to the same LAN, when in fact they are located on a number of different LAN segments. Because VLANs are based on logical instead of physical connections, they are extremely flexible.

Virtual Private Network (VPN) services provide secure network connections between different locations. A company, for example, can use a VPN to provide secure connections between geographically dispersed sites that need to access the corporate network. There are three types of VPN that are classified by the network layer used to establish the connection between the customer and provider network: Layer 1, VPNs, which are simple point-to-point connections using Layer 1 circuits such as SONET; Layer 2 VPNs (L2VPNs), where the provider delivers Layer 2 circuits to the customer (one for each site) and provides switching of the customer data; and Layer 3 VPNs (L3VPNs), where the provider edge (PE) device participates in the customer's routing by managing the VPN-specific routing tables, as well as distributing routes to remote sites. In a Layer 3 IP VPN, customer sites are connected via IP routers, e.g., provider edge (PE) and intermediate provider (P) nodes, that can communicate privately over a shared backbone as if they are using their own private network. Multi-protocol label switching (MPLS) Border Gateway Protocol (BGP) networks are one type of L3VPN solution. An example of an IP-based Virtual Private Network is disclosed in U.S. Pat. No. 6,693,878. U.S. Pat. No. 6,665,273 describes a MPLS system within a network device for traffic engineering.

Virtual Private LAN Service (VPLS) has recently emerged as a L2VPN to meet the need to connect geographically dispersed locations with a protocol-transparent, any-to-any, full-mesh service. VPLS is an architecture that delivers Layer 2 service that in all respects emulates an Ethernet LAN across a wide area network (WAN) and inherits the scaling characteristics of a LAN. All customer sites in a VPLS appear to be on the same LAN, regardless of their locations. In other words, with VPLS, customers can communicate as if they were connected via a private Ethernet LAN segment. The basic idea behind VPLS is to set up a full-mesh of label switched paths (LSPs) between each PE router so that Media Access Control (MAC) frames received on the customer side can be switched based on their MAC addresses and then encapsulated into MPLS/IP packets on the P node side and sent across the VPLS domain over the full mesh. Conceptually, VPLS can therefore be thought of as an emulated Ethernet LAN segment connected by a set of virtual bridges or virtual Ethernet switches.

In multicast data transmission, data packets originating from a source node are delivered to a group of receiver nodes through a tree structure. (In contrast, unicast communications take place between a single sender and a single receiver.) Various mechanisms, such as the Protocol Independent Multicast (PIM) protocol, have been developed for establishing multicast distribution trees and routing packets across service provider (SP) networks. One commonly used approach uses a dynamic routing algorithm to build the multicast tree by allowing group member receiver nodes to join one-by-one. When a new receiver node attempts to join, it sends a Join request message along a computed path to join the group. The routing algorithm/protocol then connects the new receiver to the exiting tree (rooted at the source) without affecting the other tree member nodes.

By way of further background, U.S. Pat. No. 6,078,590 teaches a method of routing multicast packets in a network. Content-based filtering of multicast information is disclosed in U.S. Pat. No. 6,055,364.

Recent VPLS working group drafts (draft-ieff-I2vpn-vpls-ldp-07.txt and draft-ieff-I2vpn-vpls-bgp-05) have no special handling specified for multicast data within a VPLS instance. That is, multicast data within a VPLS instance is treated the same as broadcast data and it is replicated over all the pseudowires (PWs) belonging to that VPLS instance at the ingress provider edge (PE) device. This ingress replication is very inefficient in terms of ingress PE and MPLS/IP core network resources. Furthermore, it is not viable for high bandwidth applications where replicating the multicast data N times may exceed the throughput of the ingress PE trunk. Therefore, SPs are interested in deploying multicast mechanisms in their VPLS-enabled networks that can reduce or eliminate ingress replication, e.g., either replicating the data over the PWs to the PE devices that are member of the multicast group(s) or only sending one copy of the data over each physical link among PE and P nodes destined to the PE devices that are member of the multicast group(s).

Two submissions in the Internet Engineering Task Force (IETF) L2VPN Working Group attempt to solve this problem. The first one (specified in draft-serbest-I2vpn-vpls-mcast-03.txt) uses Internet Group Management Protocol (IGMP)/PIM snooping to restrain multicast traffic over a full mesh of PWs belonging to a given VPLS. IGMP is a standard for IP multicasting in the Internet, and is defined in Request For Comments 1112 (RFC1112) for IGMP version 1 (IGMPv1), in RFC2236 for IGMPv2, and in RFC3376 for IGMPv3. (IGMPv3 includes a feature called Source Specific Multicast (SSM) that adds support for source filtering.) By snooping IGMP/PIM messages, the PE (i.e., switch or router) node can populate the Layer 2 (L2) forwarding table based on the content of the intercepted packets. Thus, a PE device can determine which PWs should be included in a multicast group for a given VPLS instance and only replicate the multicast data stream over that subset of PWs.

Although IGMP snooping helps to alleviate replication overhead, it does not completely eliminate the replication problem at the ingress PE. Therefore, this mechanism may not be viable for multicast applications with high bandwidth requirements because the aggregate data throughput after replication may exceed the bandwidth of the physical trunk at the ingress PE.

The second IETF proposal (described in draft-raggarwa-l2vpn-vpls-mcast-01.txt) tries to address the shortcomings of the previous draft by using the multicast tree to transport customer multicast data of a given VPLS service instance. However, because the unicast and multicast paths for a given VPLS instance are different, this approach can result in numerous problems. The first problem involves packet re-ordering, wherein two consecutive frames are sent on two different paths, e.g., a first frame is sent on a multicast path because of unknown destination unicast MAC address, with a second frame being sent on a unicast path after the path to the destination has been learned. If the unicast path is shorter than multicast path, the second packet can arrive ahead of the first one.

Another problem with the second IETF proposal is that bridged control packets typically need to take the same path as unicast and multicast data, which means the unicast and multicast path need to be aligned or congruent. If control packets are sent on unicast paths, any failure in the multicast path can go undetected. This situation is illustrated in FIG. 1, which shows a SP network 10 with a multicast tree 18 having a path through P nodes 14, 15, and 17 that connects PE nodes 11-13. A unicast path 19 is shown passing through P node 16. In this example, failure of P node 15 may go undetected if control packets are sent via unicast path 19. Furthermore, since unicast and multicast paths are usually different in the network core, Ethernet operations, administration, and management (OAM) connectivity check messages often cannot detect a path/node failure. Even if the failure is detected through some other means, notification of the failure to the originator of the Ethernet OAM becomes problematic.

What is needed therefore is a method and apparatus for eliminating ingress replication of multicast data within a VPLS instance that overcomes the aforementioned problems of the prior art.

BRIEF DESCRIPTION OF THE DRAWINGS

The present invention will be understood more fully from the detailed description that follows and from the accompanying drawings, which, however, should not be taken to limit the invention to the specific embodiments shown, but are for explanation and understanding only.

DETAILED DESCRIPTION

A mechanism for aligning unicast and multicast paths in a service provider network, and which thereby achieves shortest path (i.e., optimal) bridging, is described. In the following description specific details are set forth, such as device types, protocols, network configurations, etc., in order to provide a thorough understanding of the present invention. However, persons having ordinary skill in the networking arts will appreciate that these specific details may not be needed to practice the present invention.

A computer network is a geographically distributed collection of interconnected subnetworks for transporting data between nodes, such as intermediate nodes and end nodes. A local area network (LAN) is an example of such a subnetwork; a plurality of LANs may be further interconnected by an intermediate network node, such as a router, bridge, or switch, to extend the effective "size" of the computer network and increase the number of communicating nodes. Examples of the end nodes may include servers and personal computers. The nodes typically communicate by exchanging discrete frames or packets of data according to predefined protocols. In this context, a protocol consists of a set of rules defining how the nodes interact with each other.

Figure 7:
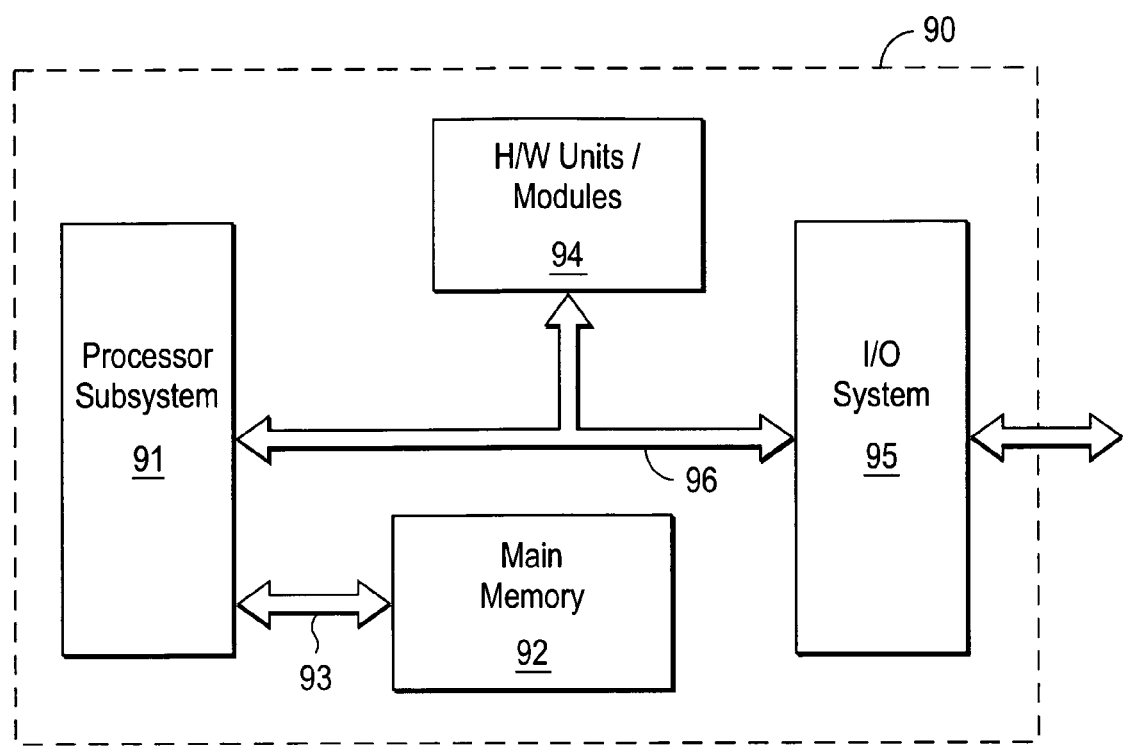
FIG. 7 is a generalized circuit schematic block diagram of a network node.

As shown in FIG. 7, each node 90 typically comprises a number of basic subsystems including a processor subsystem 91, a main memory 92 and an input/output (I/O) subsystem 95. Data is transferred between main memory ("system memory") 92 and processor subsystem 91 over a memory bus 93, and between the processor and I/O subsystems over a system bus 96. Examples of the system bus may include the conventional lightning data transport (or hyper transport) bus and the conventional peripheral component [computer] interconnect (PCI) bus. Node 90 may also comprise other hardware units/modules 94 coupled to system bus 96 for performing additional functions. Processor subsystem 91 may comprise one or more processors and a controller device that incorporates a set of functions including a system memory controller, support for one or more system buses and direct memory access (DMA) engines. In general, the single-chip device is designed for general-purpose use and is not heavily optimized for networking applications.

In a typical networking application, packets are received from a framer, such as an Ethernet media access control (MAC) controller, of the I/O subsystem attached to the system bus. A DMA engine in the MAC controller is provided a list of addresses (e.g., in the form of a descriptor ring in a system memory) for buffers it may access in the system memory. As each packet is received at the MAC controller, the DMA engine obtains ownership of ("masters") the system bus to access a next descriptor ring to obtain a next buffer address in the system memory at which it may, e.g., store ("write") data contained in the packet. The DMA engine may need to issue many write operations over the system bus to transfer all of the packet data.

According to one embodiment of the present invention, congruent (i.e., aligned) unicast and multicast paths through a MPLS/IP network are achieved in the presence of either an asymmetrical path cost or an Equal Cost Multiple Paths (ECMP) through an algorithm in which the unicast paths are first established in a standard manner across an IP network from source to receiver nodes. Trace path messages are then sent hop-by-hop over the network to capture the nodes traversed by each of the unicast paths. The node list information captured by the trace path messages is then provided to the mechanism for building the multicast distribution tree in the opposite direction, i.e., from receiver node to source node.

Figure 1:
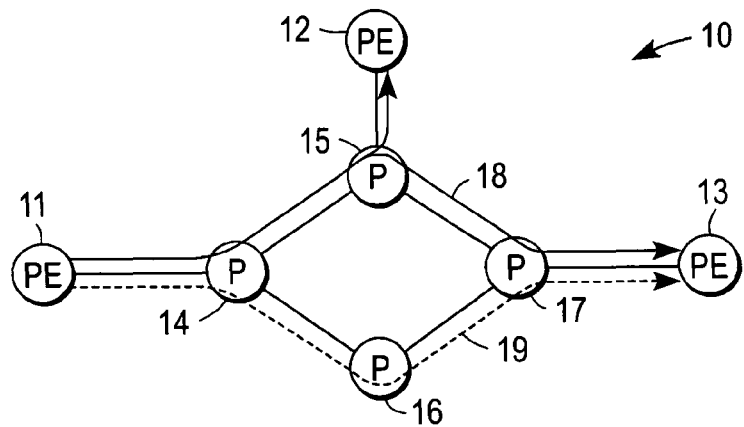
FIG. 1 is a simplified diagram of a provider network showing one problem inherent in the prior art.
Figure 2:
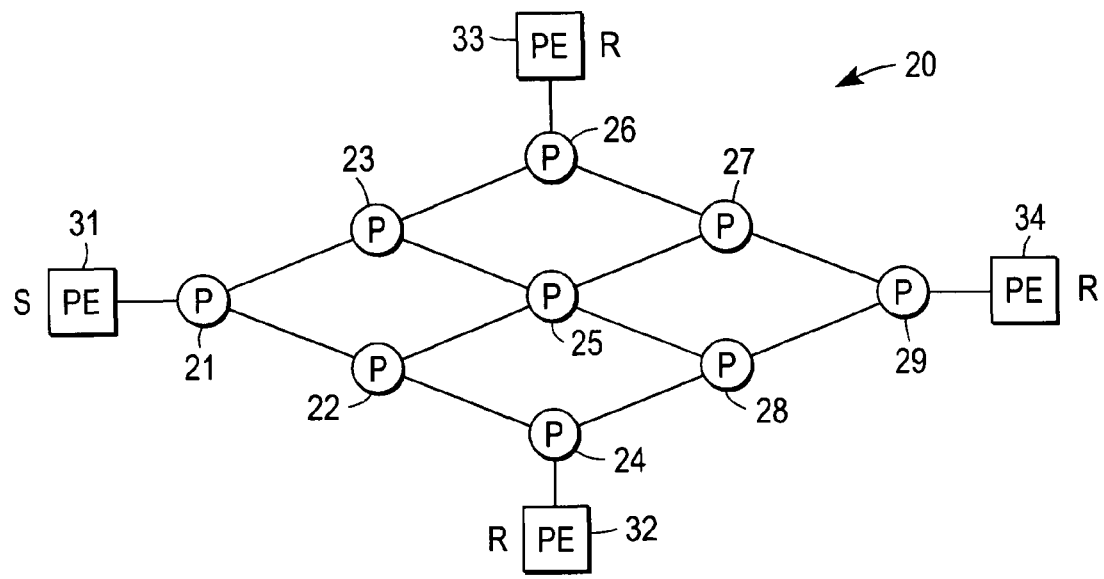
FIG. 2 illustrates an exemplary service provider network with an equal cost multiple path (ECMP) configuration in accordance with one embodiment of the present invention.

FIG. 2 illustrates an exemplary SP network 20 arranged with an equal cost multiple path (ECMP) between PE nodes 31-34 across the P-domain comprising P nodes 21-29. In this example, PE node 31 is shown as the source (S) and PE nodes 32-34 each comprise receiver (R) nodes. (In the context of the present application, a receiver or destination node refers to a router, switch, or other node device that has a multicast group member in its subnet irrespective of how the receiver joins or leaves the group. Similarly, a source node refers to a router, switch, or other node device that has a host in its subnet that is a multicast traffic source.)

Figure 3:
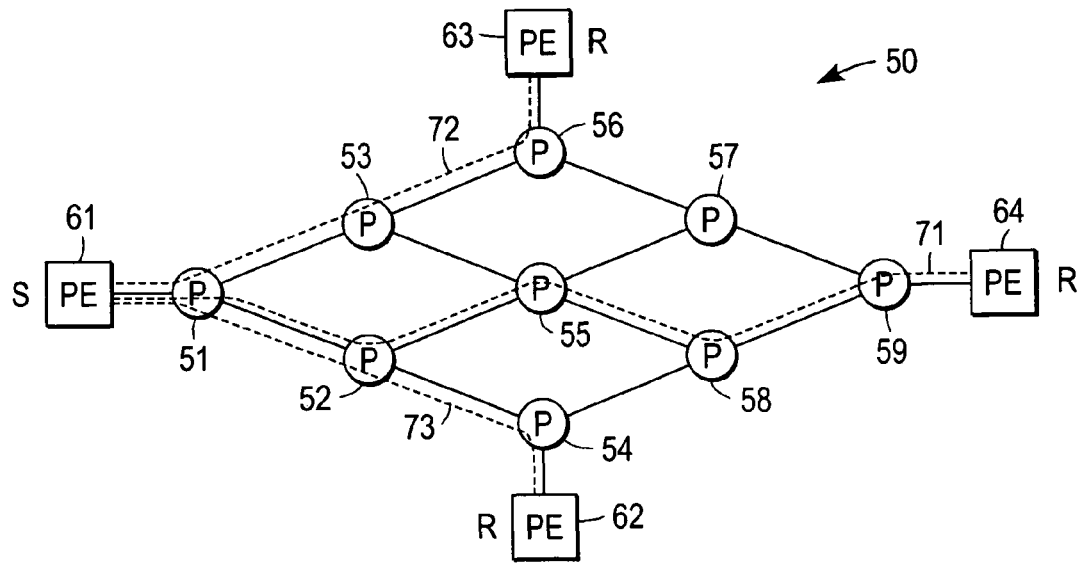
FIG. 3 illustrates an exemplary service provider network after multiple unicast paths have been established in accordance with another embodiment of the present invention.

FIG. 3 illustrates an exemplary service provider network 50 after unicast paths 71-73 have been respectively established from source PE node 61 to destination (receiver) PE nodes 64, 63, and 62 in accordance with another embodiment of the present invention. The unicast paths 71-73 may be constructed in a standard manner according to established protocols.

Figure 4:
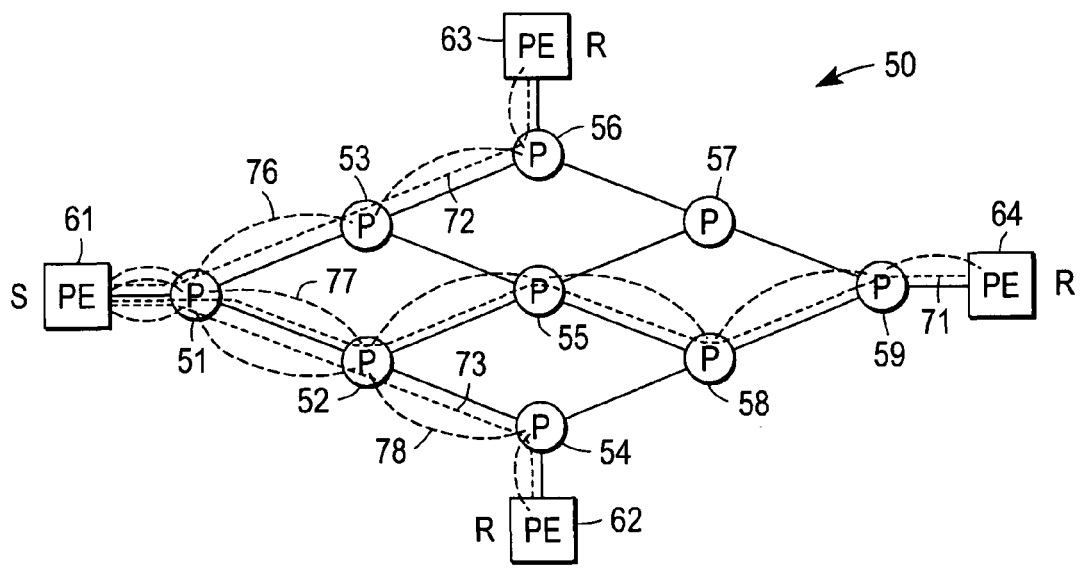
FIG. 4 illustrates the SP network of FIG. 3 after multiple trace path messages have been sent from source to receiver nodes in accordance with one embodiment of the present invention.

Once the unicast paths have been built, a trace path message is sent from source node 61 to each of the receiver nodes 62-64. These trace path messages, which are shown in FIG. 4 as dashed lines 76-78, traverse the network on a hop-by-hop basis through the P nodes of the SP network. For instance, trace path message 76 sent by source node 61 traverses P nodes 51, 53 and 56 before arriving at receiver PE node 63. Likewise, trace path message 77 sent by source node 61 traverses P nodes 51, 52, 55, 58 and 59 before arriving at receiver PE node 64; and trace path message 78 sent by source node 61 traverses P nodes 51, 52 and 55 before arriving at receiver PE node 62.

Figure 5:
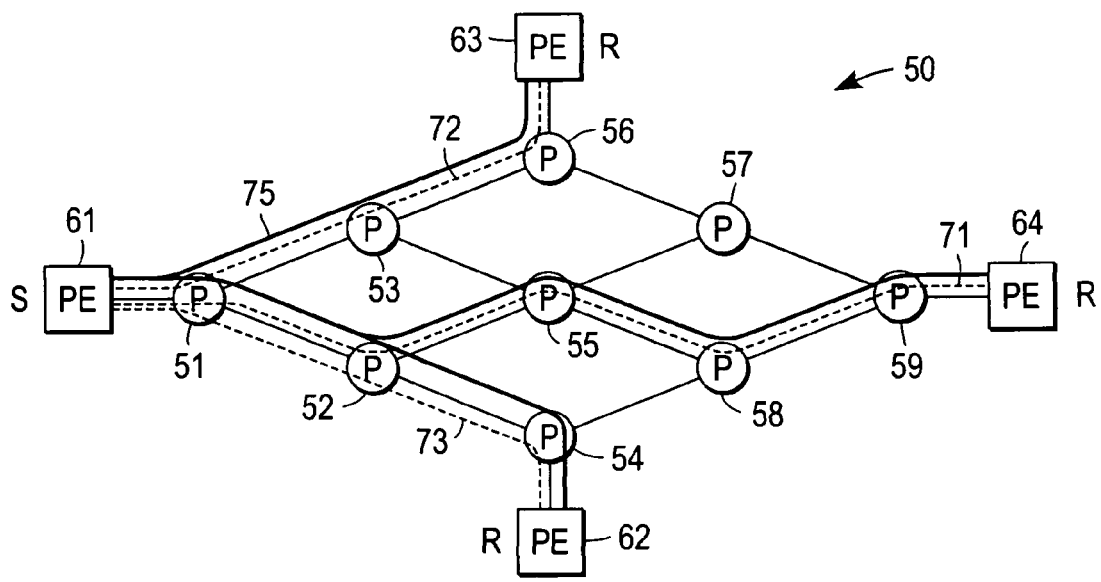
FIG. 5 shows the network diagram of FIG. 4 after creation of a multicast tree in accordance with one embodiment of the present invention.
Figure 6:
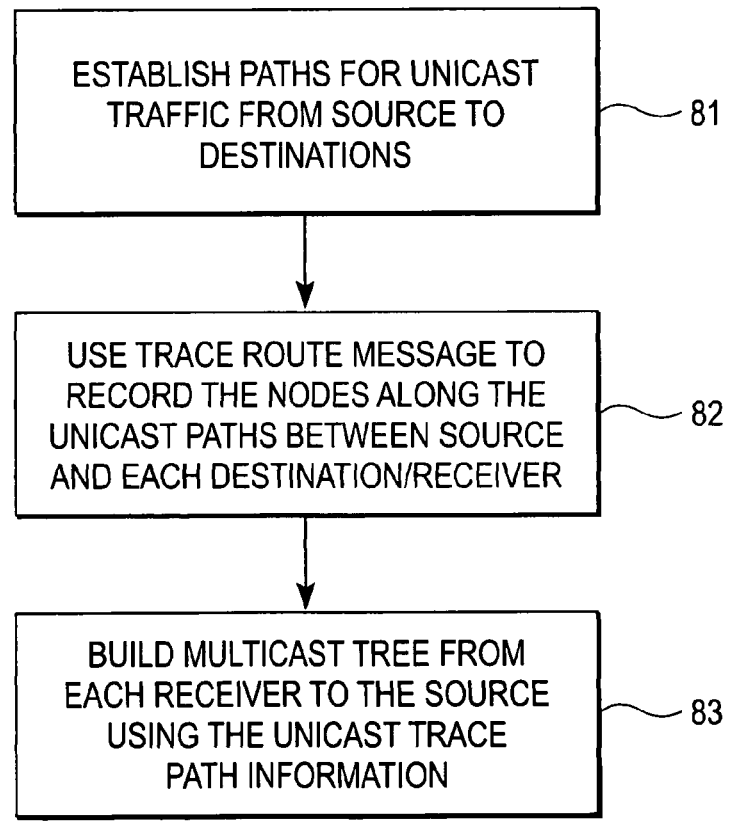
FIG. 6 is a flow chart diagram of network operations in accordance with another embodiment of the present invention.

FIG. 5 shows SP network 50 of FIG. 6 after formation of the multicast tree 75. In the example in FIGS. 3-5, the multicast path (tree) is aligned with the unicast path. As described above, in a specific embodiment the upstream (source) PE node forwards the "source route" (i.e., the IP record route through the P nodes) to the downstream (receiver) PE nodes via trace route or trace path messages. This route information is then used by the PIM protocol to send receiver-initiated Join messages back to the source PE node when building the multicast tree. In other words, for a given forwarding direction (e.g., left to right) the multicast path is aligned with the unicast path using the unicast path information in the same direction as the multicast forwarding path.

The aforementioned mechanism may utilize a new trace path PIM message or some other message type (e.g., a standard trace route message) to record the unicast path information from the ingress PE node (PE node 61 in FIG. 6) to the egress PE node(s) (PE nodes 62-64 in FIG. 6). For instance, the trace path message can be sent with the Record Route IP option or it can be built into the existing PIM protocol. Regardless of the specific form, type, or implementation of the trace path message utilized, a basic requirement is that the message should function to record a listing of the nodes along the unicast path from the ingress PE node to the egress PE node across the SP network. In one embodiment, source PE node 61 sends a separate trace path message to each of receiver PE nodes 62-64. Each receiver node then uses the list information contained therein to build a multicast tree using the PIM protocol in the opposite direction (i.e., back to source PE node 61). Thus, the unicast path information recorded by the trace path messages and provided to each receiver node overrides the normal PIM decision-making mechanism when building the multicast distribution tree from the receiver nodes back to the source node.

With continuing reference to the example of FIGS. 3-5, it should be understood that the trace path message is an independent message that travels downstream; it may be sent once, or it may be sent at periodic intervals. The trace path message traverses the SP network on a hop-by-hop basis, recording a list of all of the nodes along the path from source to receiver. By way of example, when the trace path message 77 associated with unicast path 71 arrives at PE node 64, it contains a listing that includes P nodes 51, 52, 55, 58, and 59. Similarly, when it arrives at PE node 63 the trace path message 76 associated with unicast path 72 contains a listing that includes P nodes 51, 53, and 51. Finally, when the trace path message 78 associated with unicast path 73 arrives at PE node 62, it contains a listing that includes P nodes 51, 52, and 54.

At any point along the route, the path from a given P node toward the receiver node may be determined by inspecting the forward least cost path, and choosing a path from an ECMP point based on the source IP address. Practitioners in the art will appreciate that when an ECMP point in the network is encountered a path may be selected based either on source IP address or a 3-bit EMCP selector field (assuming the maximum number of ECMPs on a given node is eight or fewer).

In one embodiment, the egress PE node terminates the propagation of the trace path message and then triggers a Join using the recorded path information. Note that in the presently described embodiment the Join is triggered immediately if the tree is inclusive (either aggregate or non-aggregate). In the event that the multicast tree is selective, then the Join may be triggered when an IGMPv3 or a PIM Join is received over an attachment circuit for the source node of interest. When a node receives a Join message from its downstream node, it uses the unicast trace path information for propagating the Join message to the upstream node.

In alternative embodiments in which a source specific multicast tree is built from the source toward receiver, source-initiated join messages may be utilized instead of receiver-initiated join messages. When sending unicast traffic associated with the multicast tree, then any ECMP selection should be consistent with the one used in choosing the mulitcast path.

In the case of a MPLS network, the resource reservation with traffic engineering (RSVP-TE) protocol may also be used to setup point-to-point (P2P) and point-to-multipoint (P2MP) LSPs to ensure their alignment. RSVP-TE allows the use of source routing where the ingress router determines the complete path through the network.

FIG. 6 is a flow chart diagram of network operations in accordance with an embodiment of the present invention wherein the multicast tree is aligned to the unicast path(s). The process begins at block 81 with the establishment of unicast paths from the source node to the destination node(s). Either concurrent with, or subsequent to, the establishment of the unicast paths, a trace path message is sent from the ingress (source) PE node to the egress (destination) PE node(s). As indicated in block 82, the trace path (trace route analogous) message records the nodes along the path from the ingress node to the egress node of the SP network. The egress PE node terminates the trace path message and then initiates the issuance of a Join message from the receiver node using the recorded path information. In other words, the multicast distribution tree is built in a direction from each receiver to the source using the information recorded by the unicast trace path message (block 83).

It should be understood that elements of the present invention may also be provided as a computer program product which may include a "machine-readable medium" having stored thereon instructions which may be used to program a computer (e.g., a processor or other electronic device) to perform a sequence of operations. A machine-readable medium" may include any computer program product, apparatus and/or device (e.g., magnetic discs, optical disks, memory, Programmable Logic Devices (PLDs) used to provide machine instructions and/or data to a programmable processor, including a machine-readable medium that receives machine instructions as a machine-readable signal. Alternatively, the operations may be performed by a combination of hardware and software. The machine-readable medium may include, but is not limited to, floppy diskettes, optical disks, CD-ROMs, and magneto-optical disks, ROMs, RAMs, EPROMs, EEPROMs, magnet or optical cards or other type of machine-readable medium suitable for storing electronic instructions.

Although the present invention has been described with reference to specific exemplary embodiments, it should be understood that numerous changes in the disclosed embodiments can be made in accordance with the disclosure herein without departing from the spirit and scope of the invention. The preceding description, therefore, is not meant to limit the scope of the invention. Rather, the scope of the invention is to be determined only by the appended claims and their equivalents.

We claim:

1. A method of operation for a provider edge (PE) node of a network, comprising:
   sending a plurality of trace path messages over the network to a corresponding plurality of receiver PE nodes, each trace path message recording a corresponding list of intermediate nodes of an established unicast path from the PE node to a corresponding one of the receiver PE nodes; and
   receiving a plurality of Protocol Independent Multicast (PIM) ioin messages, each PIM join message being initiated from the corresponding one of the receiver PE nodes, each PIM join message using the corresponding list to propagate to the PE node through the intermediate nodes to build a multicast distribution tree for multicast data transmission such that each branch of the multicast distribution tree is aligned with the established unicast path.

2. The method of claim 1 wherein the network comprises an Internet Protocol (IP) network.

3. A method of operation for a provider edge (PE) node of a network, comprising:
   receiving a trace path message sent over the network hop-by-hop from a source PE node, the trace path message recording a list of intermediate nodes of an established unicast path from the source PE node to the PE node;
   terminating the trace path message; and
   issuing a Protocol Independent Multicast (PIM) join message to build a branch of a multicast distribution tree, the PIM join message using the list to propagate to the source PE node through the intermediate nodes such that the branch of the multicast distribution tree is built aligned with the established unicast path.

4. The method of claim 3 wherein the network comprises an Internet Protocol (IP) network.

5. The method of claim 3 wherein network comprises a Multi-protocol label switching (MPDS)/Internet Protocol (IP) network.

6. A provider edge (PE) node comprising:
   a port for connection with a network; and
   a processing unit coupled to the port and configured to send a plurality of trace path messages over the network to a corresponding plurality of receiver PE nodes, each trace path message recording a corresponding list of intermediate nodes of an established unicast path from the PE node to a corresponding one of the receiver PE nodes, the processing unit being further configured to receive a plurality of Protocol Independent Multicast (PIM) join messages, each PIM join message being initiated from the corresponding one of the receiver PE nodes, each PIM join message using the corresponding list to propagate to the PE node through the intermediate nodes to build a multicast distribution tree for multicast data transmission such that each branch of the multicast distribution tree is aligned with the established unicast path.

7. The PE node of claim 6 wherein the network comprises a Multi-protocol label switching (MPLS)/Internet Protocol (IP) network.

8. The PE node of claim 6 wherein the established unicast path comprises a point-to-point tunnel.

9. A provider edge (PE) node comprising:
   a port for connection with a network; and
   a processing unit coupled to the port and configured to receive a trace path message sent over the network hop-by-hop from a source PE node, the trace path message recording a list of intermediate nodes of an established unicast path from the source PE node to the PE node, the processing unit being further configured to terminate the trace path message and issue a Protocol Independent Multicast (PIM) join message to build a branch of a multicast distribution tree, the PIM join message using the list to propagate to the source PE node through the intermediate nodes such that the branch of the multicast distribution tree is built aligned with the established unicast path.

10. A computer program product comprising a non-transitory computer useable medium and computer readable code embodied on the non-transitory computer useable medium, execution of the computer readable code causing the computer program product to configure a provider edge (PE) node to:
    send a plurality of trace path messages over the network to a corresponding plurality of receiver PE nodes, each trace path message recording a corresponding list of intermediate nodes of an established unicast path from the PE node to a corresponding one of the receiver PE nodes; and
    receive a plurality of Protocol Independent Multicast (PIM) join messages, each PIM join message being initiated from the corresponding one of the receiver PE nodes, each PIM join message using the corresponding list to propagate to the PE node through the intermediate nodes to build a multicast distribution tree for multicast data transmission such that each branch of the multicast distribution tree is aligned with the established unicast path.

11. The computer program product of claim 10 wherein the network comprises a Multi-protocol label switching (MPLS)/Internet Protocol (IP) network.

12. A computer program product comprising a non-transitory computer useable medium and computer readable code embodied on the non-transitory computer useable medium, execution of the computer readable code causing the computer program product to configure a provider edge (PE) node to:
    receive a trace path message sent over the network hop-by-hop from a source PE node, the trace path message recording a list of intermediate nodes of an established unicast path from the source PE node to the PE node;
    terminate the trace path message; and issue a Protocol Independent Multicast (PIM) join message to build a branch of a multicast distribution tree, the PIM join message using the list to propagate to the source PE node through the intermediate nodes such that the branch of the multicast distribution tree is built aligned with the established unicast path.

13. The computer program product of claim 12 wherein the network comprises an Internet Protocol (IP) network.

14. The computer program product of claim 12 wherein network comprises a Multi-protocol label switching (MPLS)/Internet Protocol (IP) network.

15. A system for alignment of multicast and unicast paths over a network, comprising:
   a plurality of receiver provider edge (PE) nodes; and
   a source provider edge (PE) node operable to send trace path messages over the network, each trace path message recording a corresponding list of intermediate nodes of an established unicast path from the source PE node to a corresponding one of the receiver PE nodes,
   wherein each receiver PE node is operable to initiate a Protocol Independent Multicast (PIM) join message for building a multicast distribution tree for multicast data transmission, the PIM join message being sent back to the source PE node upon receiving the trace path message, the PIM join message using the corresponding list to propagate to the source PE node through the intermediate nodes such that each branch of the multicast distribution tree is built aligned with the unicast paths.

16. A method of operation for a service provider (SP) network, comprising:
   creating a plurality of unicast paths from a source node to a corresponding plurality of receiver nodes;
   sending, by the source node, trace path messages over the network, each trace path message recording a corresponding list of intermediate nodes of one of the unicast paths from the source node to a corresponding one of the receiver nodes; and
   sending, by each receiver node, a Protocol Independent Multicast (PIM) join message for building a multicast distribution tree for multicast data transmission, the PIM join message being sent back to the source node upon receipt of the trace path message, the PIM join message using the corresponding list to propagate to the source node through the intermediate nodes such that each branch of the multicast distribution tree is built aligned with the unicast paths.

* * * * *